July 14, 1964    G. N. TYSON, JR    3,140,582
ROCKET PROPULSION METHOD USING BORON AND NITROGEN COMPOUNDS
Filed April 14, 1959
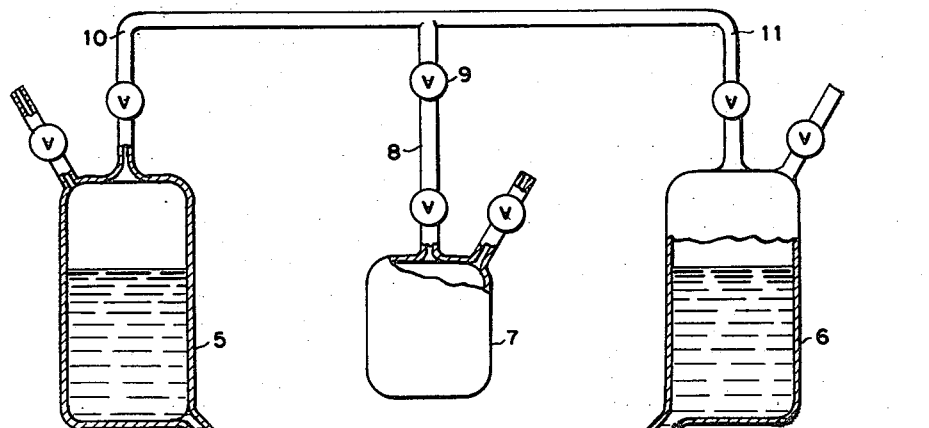
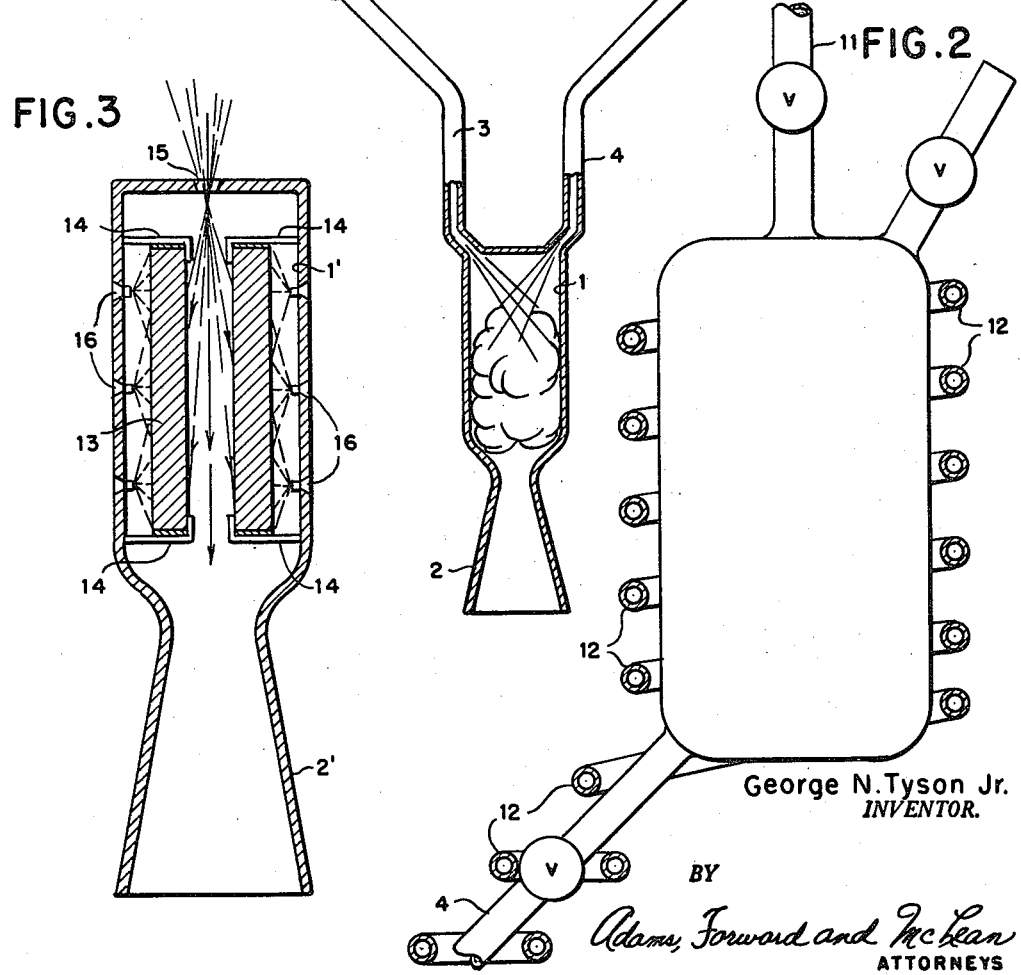
George N. Tyson Jr.
*INVENTOR.*
BY
Adams, Forward and McLean
ATTORNEYS

3,140,582
ROCKET PROPULSION METHOD USING BORON AND NITROGEN COMPOUNDS
George N. Tyson, Jr., Claremont, Calif., assignor to Olin Mathieson Chemical Corporation, a corporation of Virginia
Filed Apr. 14, 1959, Ser. No. 806,396
20 Claims. (Cl. 60—35.4)

This invention relates to a method for producing large volumes of hot gases in a short period of time, which large volumes of hot gases are useful for many purposes including imparting thrust to jet propelled devices such as rockets.

Jet propelled devices are essentially of two types: those which depend upon an external source for a portion of the propellant, and those in which the propellant is entirely contained within the device. Such latter devices are conventionally called pure rockets. This invention will be further described in relation to pure rockets and their operation.

One of the most important characteristics of a rocket propellant system is its performance index or specific impulse. This is the amount of thrust in pounds that can be obtained per pound of propellant consumed per second. Since the aim is to get as much thrust as possible per pound of propellant burned, a high value for the specific impulse is desirable.

Rocket propellants can be in the form of solids or in the form of liquids. Propellants consisting of a single liquid are termed monopropellants and include hydrogen peroxide and nitromethane. Propellants involving two liquids are termed bipropellants and normally consist of a fuel, such as a hydrocarbon, ethyl alcohol-water or ammonia and an oxidizer such as hydrogen peroxide or liquid oxygen. Other oxidizer fuel combinations include nitric acid with aniline or furfuryl alcohol. These latter combinations are termed hypergolic bipropellants since they react spontaneously upon admixture.

Hydrazine has also been used as a fuel component in bipropellant systems in combination with oxidizers such as liquid oxygen, hydrogen peroxide, white or red fuming nitric acid, or liquid fluorine. It is spontaneously inflammable with nitric acid and with fluorine. The specfic impulse of hydrazine when burned with liquid oxygen varies from 257 to 264 pound-seconds per pound at 300 p.s.i.a. for various fuel-oxygen ratios, the value being higher in the presence of excess fuel, and when fluorine is used as the oxidizer, the specific impulse at 300 p.s.i.a. is about 298 pound-seconds per pound.

It has been proposed to employ the boron hydrides including diborane, tetraborane and the pentaboranes as fuel components in bipropellant systems wherein liquid oxygen is the oxidizer. Such systems supply high calculated specific impulses of about 290 pound-seconds per pound at 300 p.s.i.a.

Both hydrazine and the boron hydrides are strong reducing agents, reacting vigorously with a variety of oxidizers. It has now been discovered that, surprisingly, nitrogen containing compounds which are normally considered to be reducing agents react with boron containing compounds which are also normally considered to be reducing agents. Moreover, it has been found that the reactions produce a very high specific impulse, of the order of 300 pound-seconds per pound at 300 p.s.i.a.

Thus large volumes of hot gases are produced according to the present invention by reacting a nitrogen containing compound composed only of nitrogen, hydrogen and carbon with a boron containing compound composed only of boron, hydrogen and carbon; providing that hydrogen is present in at least one of the reactants and providing that carbon is present in at least one of the reactants.

The nitrogen containing compound and the boron containing compound are reacted in such proportions that all of the nitrogen and all of the boron react to produce boron nitride, the carbon is released as elemental carbon and large volumes of hydrogen gas are produced.

Nitrogen containing compounds which can be employed as reactants include the saturated hydronitrogens such as ammonia, hydrazine, triazane, tetrazane; the unsaturated hydronitrogens such as diimide, triazene, tetrazene, isotetrazene, ammonium azide, hydrazine azide, and hydrazoic acid; alkyl hydrazines such as methyl hydrazine, unsymmetrical dimethyl hydrazine, ethyl hydrazine, unsymmetrical diethyl hydrazine; alkylamines including mixed alkylamines such as methylamine, dimethylamine, trimethylamine, ethylamine, diethylamine, triethylamine, methyl ethyl amine, n-propylamine, isopropylamine, di-n-propylamine, tri-n-propylamine, methyl propyl amine, ethyl propylamine, and the like; alkylene diamines such as ethylene diamine and trimethylene diamine; hydrocyanic acid, alkyl nitriles such as acetonitrile and propionitrile, and alkenyl nitriles such as acrylonitrile; alkyl azides such as methyl azide, ethyl azide and propyl azide; cyanogens such as cyanogen, isocyanogen and isocyanogen tetrazide; carbon subnitride; cyanamide, ammonium cyanamide, and alkyl cynamides such as methyl cyanamide and ethyl cyanamide, and dicyandiamide. Mixtures of the above nitrogen containing compounds can also be employed as can their solutions in ammonia or hydrazine. Isocyanogen tetrazide, $C_2N_{14}$, melting point 89° C., can be prepared, for example, by the reaction of isocyanogen tetrabromide in acetone or absolute ethanol with sodium azide, activated by rubbing with a trace of $N_2H_4 \cdot H_2O$ and precipitated from a little water with acetone, in water at 0° C. with stirring, according to the method described in application Serial No. 806,210, of Christoph J. Grundmann et al. filed of even date herewith, now U.S. Patent No. 2,990,412.

Boron containing compounds which can be employed as reactants include boron hydrides such as diborane, tetraborane, pentaborane-9 ($B_5H_9$), dihydropentaborane ($B_5H_{11}$), decaborane; alkyl boranes such as trimethyl borane, triethylborane and diethyl methyl borane; the reaction products of diborane with ethylene disclosed in application Serial No. 540,140, filed October 12, 1955, of Weilmunester et al.; the reaction products of diborane with acetylene disclosed in application Serial No. 514,122, filed June 8, 1955 of Stange et al.; the reaction products of diborane with 3 to 5 carbon atom acetylenes or dienes disclosed in application Serial No. 533,944, filed September 13, 1955 of Weilmuenster et al.; monoethyltetraborane disclosed in application Serial No. 505,706, filed May 3, 1955 of Faust et al.; monoalkyl pentaboranes such as monomethylpentaborane-9, monoethylpentaborane-9, mono-n-propylpentaborane-9 disclosed in application Serial No. 497,408, filed March 28, 1955, now U.S. Patent No. 3,038,012 of Altwicker et al. and application Serial No. 501,742, filed April 15, 1955 of Chiras et al.; dialkylpentaboranes such as diethylpentaborane-9 disclosed in application Serial No. 540,145, filed October 12, 1955 of Paustian et al., and now abandoned; the mono- di- and trialkyldecaboranes such as monomethyldecaborane, dimethyldecaborane, ethyldecaborane, diethyldecaborane, triethyldecaborane disclosed in application Serial No. 497,407, filed March 28, 1955, now U.S. Patent No. 2,999,117, of Altwicker et al.; reaction products of acetylenic hydrocarbons with decaborane and alkyldecaboranes such as those disclosed in application Serial No. 741,976, filed June 13, 1958 of Ager, Jr. et al., now abandoned, and application Serial No. 779,788, filed December 11, 1958 of Clark et al., now U.S. Patent No. 3,092,664. Mixtures of the above boron containing compounds can also be employed as can solutions of the solid compounds in the liquid compounds.

The nitrogen containing compounds and the boron containing compounds described above react to produce very finely divided solid boron nitride, very finely divided carbon, and large volumes of hydrogen gas. The following are representative equations illustrative of the reactions which take place:

$5NH_3 + B_5H_9 \rightarrow 5BN + 12H_2$
$(CH_3)_2N_2H_2 + B_2H_6 \rightarrow 2BN + 2C + 7H_2$
$2N_2H_4 + B_4H_9C_2H_5 \rightarrow 4BN + 2C + 11H_2$
$5CH_3NH_2 + B_5H_9 \rightarrow 5BN + 5C + 13H_2$
$10C_3H_3N + B_{10}H_{13}CH_3 \rightarrow 10BN + 31C + 23H_2$
$5CH_3N_3 + 3B_5H_{11} \rightarrow 15BN + 5C + 24H_2$
$C_2N_{14} + 7B_2H_6 \rightarrow 14BN + 2C + 21H_2$ Some of the above nitrogen containing compounds react spontaneously with the boron containing compounds so that care must be used in their handling.

In addition to the extremely high specific impulses produced by the above reactions the use of the above nitrogen containing compounds and the above boron containing compounds as bipropellants for rockets is especially advantageous since in most instances both of the fuel components are either normally liquid or can be dissolved in a fuel component which is normally liquid. Moreover, tetraborane, which boils at 16° C., can be easily liquified, and diborane, which boils at −92.5° C. is much more easily liquified than, for example, oxygen.

The operation of a rocket engine employing a bipropellant consisting of a nitrogen containing compound and a boron containing compound will be described with reference to the accompanying drawing, which depicts schematically in FIGURES 1 and 2 a conventional rocket engine employing liquid bipropellants and in FIGURE 3 an engine employing liquid and solid components of a bipropellant.

In FIGURE 1 of the drawing, numeral 1 represents the reaction chamber and numeral 2 the nozzle of the rocket engine. Chamber 2 is connected by valved lines 3 and 4 to vented tanks 5 and 6 respectively which contain respectively unsymmetrical dimethyl hydrazine and pentaborane-9 as the propellants. Tank 7 contains, for example, a compressed inert gas such as nitrogen and is connected by line 8, containing pressure regulator 9, and branched, valved lines 10 and 11 respectively to tanks 5 and 6. Reaction chamber 1 is generally quite small in comparison with the size of the propellant tanks 5 and 6. The pressure in reaction chamber 1 during the reaction can be controlled by the rate of addition of the propellants and is generally in the range of 300–1000 p.s.i.a. The propellants are forced into reaction chamber 1 against this pressure and the compressed inert gas from tank 7 is employed to apply pressure to tanks 5 and 6. Instead of a compressed inert gas, pumps can be used for this purpose and on larger devices turbopumps can be employed driven by turbines supplied with hot gases from a separate gas generator.

The propellants enter reaction chamber 1 through an injector which can be of the impinging stream, multiple hole type, with or without a splash plate, or of the spray type. In the former, the propellants are separately injected through a number of separate holes in such a manner that the resulting propellant streams intersect each other and both will break up into small droplets. Spray type injectors give conical, cylindrical, or other types of spray sheets of propellnat fluids, which intersect and thereby atomize and mix.

In some instances, the bipropellant system is hypergolic so that igniting means are not required. To facilitate start-up, however, a glow plug, spark plug or flame lance can be provided. Such igniting means are also provided where the system is not hypergolic.

Since it is almost impossible to synchronize exactly the propellant feed of a bipropellant system when starting the rocket engine, the nitrogen containing compound flow is advantageously first initiated. The propellant valves can be controlled to operate in sequence and only partially opened until reaction is established at which time they are fully opened. After start-up, the flow ratio of nitrogen containing compound to boron containing compound is adjusted to be approximately stoichiometric for the reaction of all of the boron in the latter with all of the nitrogen in the former to form boron nitride, BN.

Liquid propellants mostly are reacted in the temperature range of 2000° F. to 5500° F. at pressures between 300 and 1500° p.s.i.a. The reaction pressure, as stated previously, can be controlled by the rate of flow of the propellants. The nitrogen containing compounds and the boron containing compounds described above react at relatively high temperatures of 4500° to 5000° F. at these pressures. For rocket engines designed for relatively long periods of sustained operating duration, the engine can be cooled, for example by a regenerative cooling system using one of the bipropellant fuel elements or another relatively inert fluid as the coolant flowing through a jacket surrounding the reaction chamber.

FIGURE 2 of the drawing shows a modification of FIGURE 1 wherein tank 6 and line 4 are surrounded by heating coil 12. The modification shown in FIGURE 2 permits the use of low melting point solid boranes such as decaborane in liquid bipropellant systems.

FIGURE 3 of the drawing shows a hybrid liquid-solid bipropellant system. In this system, numeral 1' represents the reaction chamber and numeral 2' the nozzle of the rocket engine. In chamber 1' there is a cored solid propellant component 13, which can be, for example, decaborane, suspended by holding device 14. The solid propellant component can have its ends coated with an inhibitor. The liquid propellant component, which can be for example, liquid ammonia, enters through injector 15 so as to contact the internal surface of the cored solid propellant and through injectors 16 so as to contact the external surface of the cored solid propellant.

I claim:

1. A method for producing a stream of large volumes of hot gases which comprises reacting in a confined reaction chamber at a temperature of at least about 4500° F. a mixture consisting essentially of a nitrogen containing compound composed only of nitrogen, hydrogen and carbon containing up to 14 nitrogen atoms and up to 9 carbon atoms with a boron containing compound composed only of boron, hydrogen and carbon containing up to 10 boron atoms and up to 6 carbon atoms in a reaction zone in a ratio approximately stoichiometric for the reaction of all of the nitrogen in the nitrogen containing compound with all of the boron in the boron containing compound to form boron nitride, BN, at least one of the said compounds containing hydrogen, and at least one of the said compounds containing carbon, and exhausting the reaction products.

2. The method of claim 1 wherein the nitrogen containing compound is unsymmetrical dimethyl hydrazine and the boron containing compound is pentaborane-9.

3. The method of claim 1 wherein the nitrogen containing compound is hydrazine and the boron containing compound is methyl decaborane.

4. The method of claim 1 wherein the nitrogen containing compound is hydrazine and the boron containing compound is ethyl decaborane.

5. A method of operating a jet propelled device which comprises separately supplying to the reaction chamber of the device a nitrogen containing compound and a boron containing compound to provide a reaction mixture consisting essentially of a nitrogen containing compound composed only of nitrogen, hydrogen and carbon containing up to 14 nitrogen atoms and up to 9 carbon atoms and a boron containing compound comopsed only of boron, hydrogen and carbon containing up to 10 boron atoms and up to 6 carbon atoms, at least one of said compounds containing hydrogen, and at least one of the said compounds containing carbon, reacting the nitrogen containing compound with the boron containing compound in a ratio approximately stoichiometric for the reaction of all of the nitrogen with all of the boron to form boron nitride, BN, and exhausting the resulting gases from said device so as to impart thrust thereto.

6. The method of claim 5 wherein the nitrogen containing compound is unsymmetrical dimethyl hydrazine.

7. The method of claim 5 wherein the nitrogen containing compound is ammonia.

8. The method of claim 5 wherein the nitrogen containing compound is hydrazine.

9. The method of claim 5 wherein the nitrogen containing compound is unsymmetrical dimethyl hydrazine and the boron containing compound is pentaborane-9.

10. The method of claim 5 wherein the nitrogen containing compound is hydrazine and the boron containing compound is methyl decaborane.

11. The method of claim 5 wherein the nitrogen containing compound is hydrazine and the boron containing compound is ethyl decaborane.

12. A method for producing thrust to a rocket which comprises introducing a bipropellant consisting essentially of a nitrogen containing compound composed only of nitrogen, hydrogen and carbon containing up to 14 nitrogen atoms and up to 9 carbon atoms and a boron containing compound composed only of boron, hydrogen and carbon containing up to 10 boron atoms and up to 6 carbon atoms, at least one of the said compounds containing hydrogen, and at least one of the said compounds containing carbon, into a rocket in contact with each other in a reaction zone therein in proportions approximately stoichiometric for the reaction of all of the nitrogen with all of the boron to form boron nitride, BN, and reacting the bipropellant in the reaction zone.

13. The method of claim 12 wherein the nitrogen containing compound is ammonia.

14. The method of claim 12 wherein the nitrogen containing compound is hydrazine.

15. The method of claim 12 wherein the nitrogen containing compound is unsymmetrical dimethyl hydrazine and the boron containing compound is pentaborane-9.

16. The method of claim 12 wherein the nitrogen containing compound is hydrazine and the boron containing compound is methyl decaborane.

17. The method of claim 12 wherein the nitrogen containing compound is hydrazine and the boron containing compound is ethyl decaborane.

18. A method for producing a stream of large volumes of hot gases which comprises reacting at a temperature of at least about 4500° F. a mixture consisting essentially of ammonia and a borane selected from the class consisting of pentaborane-9 and decaborane in a confined reaction zone in a ratio approximately stoichiometric for the reaction of all of the nitrogen in the ammonia with all of the boron in the borane to form boron nitride, BN, and exhausting the reaction products.

19. A method for operating a jet propelled device which comprises separately supplying to the reaction chamber of the device liquid ammonia and a borane selected from the class consisting of pentaborane-9 and decaborane to provide a reaction mixture consisting essentially of ammonia and borane, reacting the ammonia with the borane in a ratio approximately stoichiometric for the reaction of all of the nitrogen in the ammonia with all of the boron in the borane to form boron nitride, BN, and exhausting the resulting gases from said device so as to impart thrust thereto.

20. A method for producing thrust to a rocket which comprises introducing a bipropellant consisting essentially of ammonia and a borane selected from the class consisting of pentaborane-9 and decaborane into the rocket in contact with each other in a reaction zone therein in proportions approximately stoichiometric for the reaction of all of the nitrogen in the ammonia with all of the boron in the borane to form boron nitride, BN, and reacting the bipropellant in the reaction zone.

References Cited in the file of this patent

Vernet-Lozet: Interavia, vol. 12, No. 8, Aug. 1957, pp. 799–801.

Leonard: J.A.R.S., No. 72, December 1947, pp. 10 and 14.

Hurd: "Chemistry of the Hydrides," John Wiley & Sons, N.Y. (1952), page 84.

American Chemical Society Journal, vol. 75, Jan. 3, 1953, p. 756.